June 8, 1926. 1,588,396
S. B. WINN
TRACTOR DUMP BODY TRAILER COMBINATION
Filed Dec. 22, 1924    3 Sheets-Sheet 1
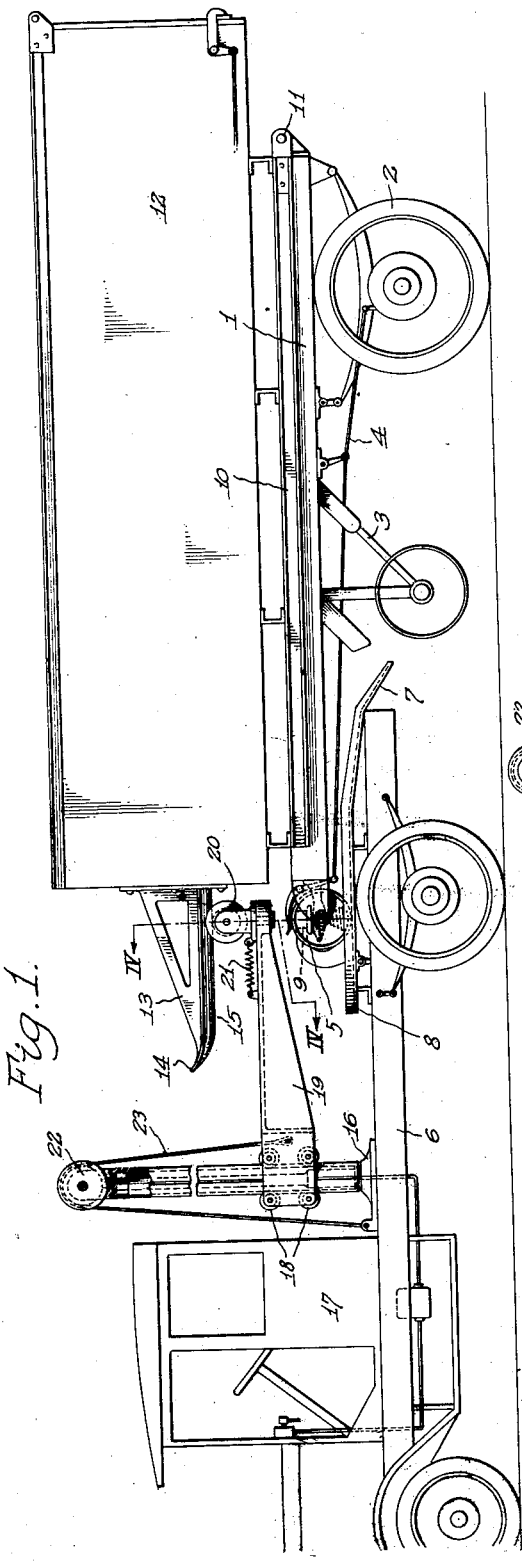
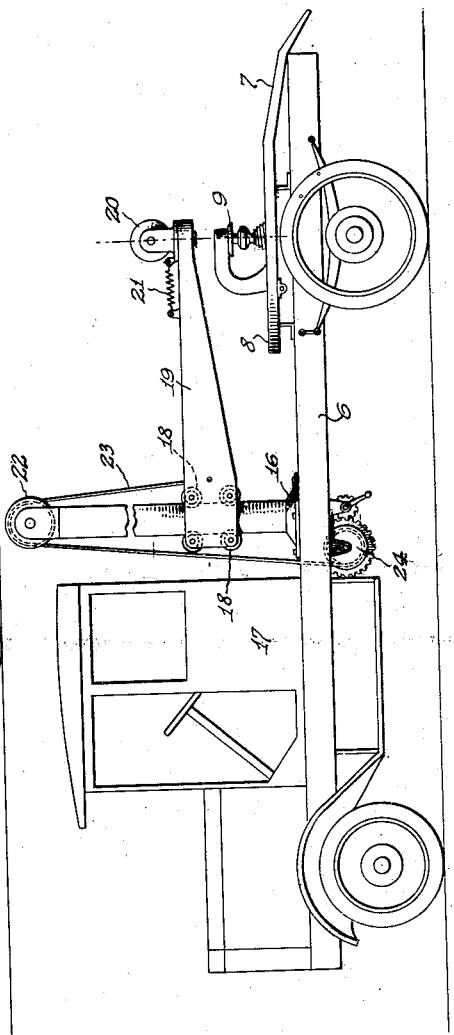
Inventor
Sidney B. Winn,
By
Attorneys June 8, 1926.
S. B. WINN
1,588,396
TRACTOR DUMP BODY TRAILER COMBINATION
Filed Dec. 22, 1924    3 Sheets-Sheet 2
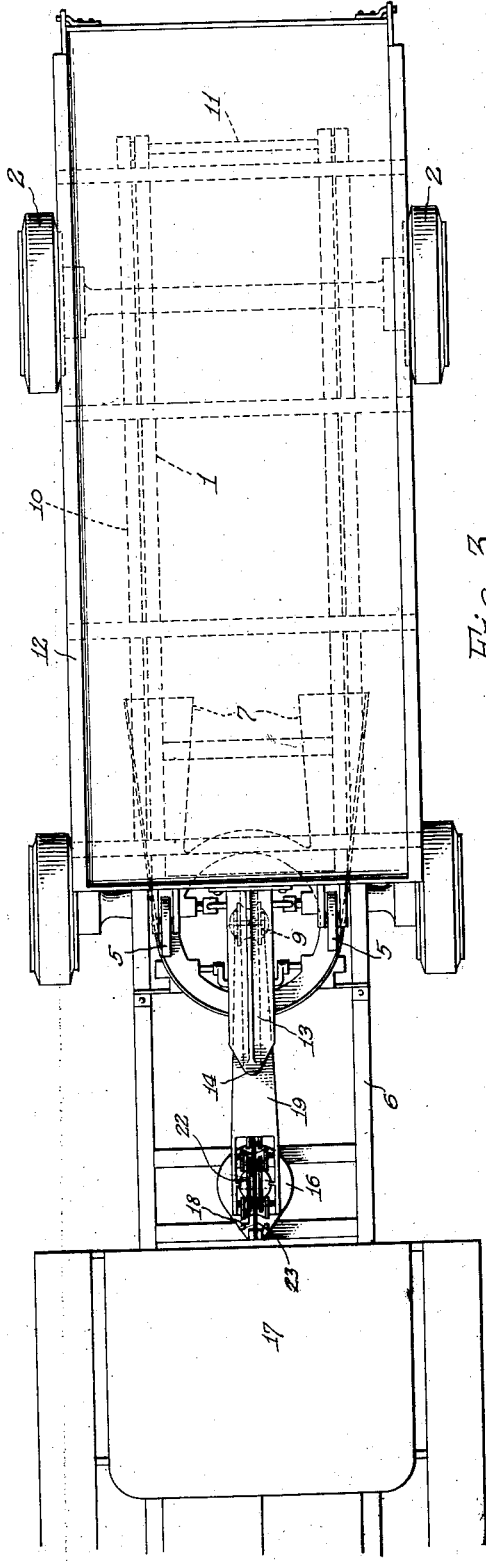
Fig. 3.
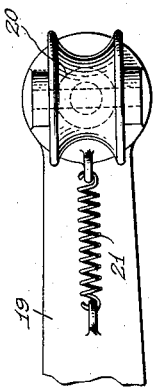
Fig. 5.
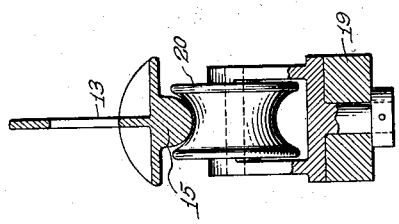
Fig. 4.
Inventor
Sidney B. Winn,
By 
Attorney

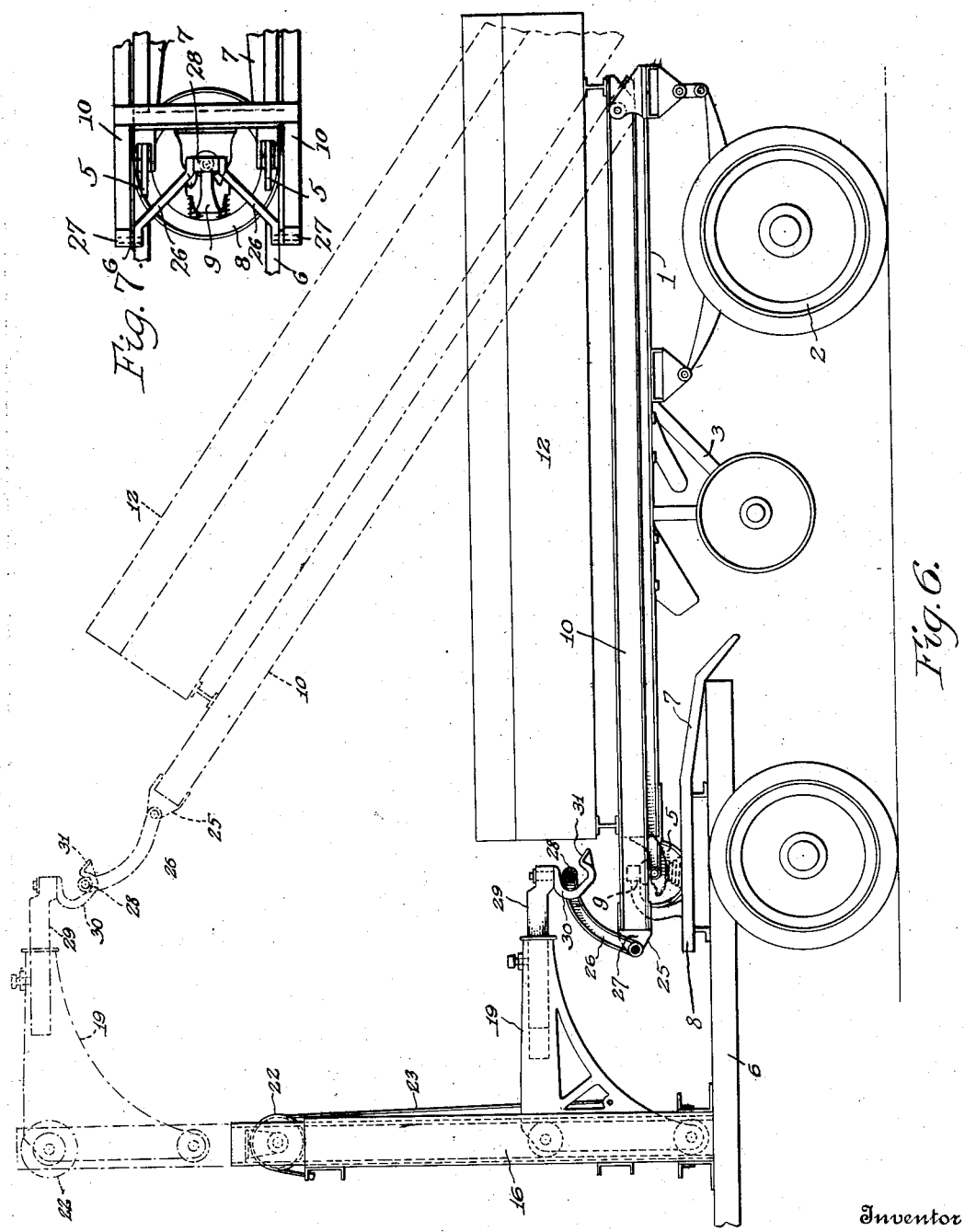

Patented June 8, 1926.

1,588,396

UNITED STATES PATENT OFFICE.

SIDNEY B. WINN, OF LAPEER, MICHIGAN.

TRACTOR DUMP-BODY TRAILER COMBINATION.

Application filed December 22, 1924. Serial No. 757,394.

This invention relates to tiltable dump body vehicles wherein a dump body has its rear end pivoted on the rear end of the vehicle so that the forward end of the dump body may be raised to place the dump body at an inclination to the vehicle for an endwise discharge of a load from the dump body. Ordinarily such vehicles are provided with power means, such as a hoist, for raising the forward end of the tiltable dump body, and generally, my invention has reference to a particular portion of the power means or hoist, which portion is of special design for my purpose. More specifically, my invention relates to a tractor trailer combination equipped with a tiltable dump body and power means or a hoist for operating the tiltable dump body when there is a service condition established between a tractor and trailer, irrespective of any angular relation between the tractor and trailer.

The primary object of my invention is to furnish a tiltable dump body and a hoist with engageable and disengageable means of establishing an operative relation between the hoist and the tiltable dump body, said means permitting of the hoist and dump body being separated at will and the hoist used for other dump bodies constructed in accordance with this invention. Said means includes an arrangement of parts by which the hoist is effective when in different positions relative to the dump body.

In my Patent No. 1548967 dated Aug. 11, 1925, there is disclosed a trailer adapted to have its forward end supported on and attached to the rear end of a tractor, and the trailer has a shiftable supporting leg and brake mechanism so that the forward end of the trailer may be safely supported, with the brakes applied, when not supported on the trailer. With the brakes released the trailer may be moved about and the brake mechanism is such that it may be controlled from the tractor when the trailer is attached thereto. It is on this type of trailer that I mount a dump body and pivotally connect the rear end of the body to the trailer so that the forward end of the dump body may be raised to cause endwise discharge of a load from the dump body. There are various types of dump bodies that I may use, but in each instance there will be a special equipment embodying a feature of this invention.

The tractor, disclosed in my patent, includes, among other things, a track to facilitate placing the forward end of the trailer on the rear end of the tractor; a turn table or fifth wheel connection to permit of the tractor turning relative to the trailer; coupling mechanism by which the forward end of the trailer may be connected to the rear end of the tractor; mechanism operatable by the tractor for shifting the supporting leg of the trailer, and mechanism operatable from the tractor for controlling the brakes of the trailer. It is on this type of tractor that I place power means or a hoist for raising the forward end of the dump body on the trailer, and said hoist includes engageable and disengageable means of establishing an operative relation between the hoist and the dump body, with said means in vertical alinement with the coupling or fifth wheel connection between the tractor and trailer, so that irrespective of any angularity between the tractor and trailer, the hoist is at all times in operative relation to the dump body for load discharging purposes.

My invention will be hereinafter specifically described and then claimed, and reference will now be had to the drawings, wherein Figure 1 is a side elevation, more or less diagrammatic, of a tractor dump body trailer combination in accordance with this invention;

Fig. 2 is a side elevation of the tractor;

Fig. 3 is a plan of the combination shown in Fig. 1;

Fig. 4 is an enlarged cross sectional view taken on the line IV—IV of Fig. 1;

Fig. 5 is a plan of the caster or anti-frictional bearing forming part of the hoist;

Fig. 6 is an elevation, mostly diagrammatic, of a portion of a tractor-trailer combination, illustrating another form of my invention.

Fig. 7 is a plan of a portion of the tractor trailer combination shown in Fig. 6.

For an understanding of this invention I show one of my tractor trailer combinations wherein a trailer body or chassis 1 has a rear truck 2, a shiftable wheeled supporting leg 3, a brake mechanism generally designated 4, and wheels 5 at the forward end of the trailer body or chassis to facilitate placing the forward end of a trailer on the tractor.

The tractor is designated 6 and has its rear end provided with a track 7 and a turn table 8 for the wheels 5, said turntable and wheels constituting a fifth wheel connection between the trailer and the tractor so that the latter may turn relative to the former. The tractor and trailer are connected by a coupling mechanism generally designated 9 and the brake mechanism of the trailer is operatable from the tractor through said coupling mechanism. Briefly, this is an example of a tractor trailer combination for the purposes of describing my invention, and reference will now be had to the trailer equipment which includes a frame 10 having its rear end pivotally connected or similarly articulated, as at 11, with the rear end of the trailer body or chassis, so that the forward end of the frame 10 may be raised. Mounted on the frame 10 is a conventional form of dump body 12 and this body may discharge its load from its rear end as the forward end of the body is raised.

Mounted on the forward end of the dump body 12 in the same vertical plane as the coupling mechanism 9 between the tractor and trailer is a forwardly extending shoe or body member 13 which has its forward end upturned, as at 14, and its lower face formed with a rail 15.

Considering the tractor equipment there is a mast 16 on the tractor, between the turntable 8 and the cab 17. Slidable on the mast 16 are the anti-frictional bearings 18 of a horizontally disposed rearwardly extending beam 19, said beam extending to a point between the body shoe or member 13 and the coupling mechanism 9 of the tractor trailer combination. On the rear end of the beam 19 is swiveled a caster, roller or anti-frictional bearing 20, preferably in the form of a grooved roller on which bears the rail 15 of the shoe or body member 13. The beam roller 20 is maintained normally in alinement with the beam 19 by a coiled retractile spring 21 attached to the beam, said spring permitting a swiveled action of the roller relative to the beam. This is essential in order that the tractor with its longitudinal beam may turn at an angle to the trailer and yet be in position for raising the forward end of the dump body 12 if such is required. This is brought about by retaining the beam roller at all times in a vertical axis of the coupling mechanism 9, and it is to be noted that the shoe or body member 13 is of sufficient length to permit of the beam 19 raising the shoe with the rail 15 thereof riding on the roller 20 so that the forward end of the dump body will be supported from the beam while being tilted to discharge its load.

As examples of means for raising the hoist beam 19, I show the mast 16 to be of a pneumatic or hydraulic type with a sheave 22 at its upper end over which is trained a cable or other flexible member 23 having one end attached to the base of the mast and its opposite end attached to the beam. Then again, as shown in Fig. 2, the mast may be stationary and one end of the cable 23 attached to and wound on a windlass 24 that may be hand operated. In either instance there is power means for raising the beam 19 and this beam constitutes a horizontal power member for service in connection with the dump body vehicle, such as represented by the trailer 1 and its dump body 12.

In the operation of the tractor trailer combination the power beam 19 and the shoe 13 constitute engageable and disengageable means of articulating the hoist and dump body for service conditions. When the tractor backs towards the trailer to establish a service condition therewith the forward end or nose of the shoe 13 encounters the grooved roller 20 and causes the shoe rail 15 to ride on to the grooved roller. Even though the tractor is at an angle to the trailer, engagement of the roller with the forward end of the shoe will cause a swinging movement of the roller into alinement with the rail as the roller is backed under the shoe and with the roller coaxially of the coupling mechanism 9, the tractor may swing into alinement with the trailer for hauling purposes. It is obvious from the foregoing that the tractor may back the trailer into a position to discharge its load, turn at an angle to the trailer to clear passing traffic, and then permit of the hoist being operated to raise the forward end of the dump body to cause discharge of its load.

Considering Fig. 6 of the drawing, the tiltable body supporting frame 10 of the trailer chassis 1 has its forward end projecting beyond the body 12 and provided with shouldered bearings 25 for a pivoted swingable yoke or link member 26 which bears normally against shoulders 27 of the bearings 25 and is supported thereby in an overhanging position relative to the forward end of the trailer. The upper end of the yoke or link member 26 has an anti-frictional roller 28 in the vertical axis of the turntable or fifth wheel connection between the tractor and trailer, and said member may be considered as a swingable shoe adapted to be lifted for tilting the body 12, as shown by dot and dash lines.

The hoist or power beam 19 is provided with an adjustable extension or support 29 for a swiveled hook or hanger 30 having a cam or beveled bill 31. When the tractor is backed into operative relation to the trailer, the hook or hanger 30 assumes a coupled relation to the yoke or link member 26, and when the hoist is operated, the hook or hanger 30 raises the link or yoke member 26, causing it to swing and elevate the forward end of the frame 10 until the body 12 is tilted at a desired angle to discharge its load. The extension or support 29 is adjustable so that the hook or hanger 30 may be correctly positioned for engagement with the yoke or link member 26, and various means may be employed for fixing or setting the extension in an adjusted position. This may be done prior to the tractor leaving the factory so that there will be no slippage or cause for readjustment.

Comparing this form of hoist and dump body connection with that previously described, it will be noted that the dump body, when tilted, is somewhat hung from the hoist and should anything happen at the body pivot, the body can not slip from the trailer chassis.

The preferred embodiments of my invention have been illustrated somewhat diagrammatically because I do not care to confine my invention to any details of construction other than defined by the appended claims.

What I claim is:—

1. A tractor, a trailer chassis detachably connected to said tractor and adapted for serviceable movement independent of the tractor, a raisable body on said trailer chassis to facilitate unloading, a yoke carried by said body, and means on said tractor partially surrounding a portion of said yoke adapted for raising said body, said means being free for disengagement from said yoke when said tractor is detached from said trailer chassis.

2. A tractor, a trailer chassis, a raisable body on said trailer chassis to facilitate unloading, a yoke carried by said body normally overhanging a body frame, and means on said tractor engageable and disengageable with said yoke adapted for raising said body whereby said yoke approaches alinement with said body frame as said body is raised.

3. A tractor trailer combination including a tractor, a trailer detachably connected to said tractor, a hoist on the tractor, a dump body on the trailer, and a swiveled hook and pivoted yoke connection between said hoist and dump body.

4. A tractor trailer combination including a tractor, a trailer detachably connected to said tractor and having a fifth wheel action thereon, a hoist on the tractor, a dump body on the trailer, and an automatically engageable and disengageable connection between said hoist and dump body above the fifth wheel action connection thereof and turnable in synchronism with the fifth wheel action of said tractor and trailer.

5. In a tractor trailer combination wherein a tractor and trailer are coupled for combined service and engageable and disengageable at will by uncoupling for independent service, and wherein the trailer has a wheeled support for the forward end of the trailer when independent of the tractor; a hoist on said tractor extending over said coupling, and a dump body on said trailer with the forward end of said dump body disposed to be engaged by said hoist to place said dump body at an angle to said trailer.

6. A tractor, a trailer having a wheeled support for the forward end thereof so that said trailer may be moved about independent of said tractor, a coupling for said tractor and trailer which permits of said tractor backing under said trailer to automatically establish a service condition between said tractor and trailer, a dump body frame on said trailer, said dump body frame having a portion thereof overhanging said coupling, and means coaxially of said coupling and above the overhanging portion of said dump body frame adapted to cause said dump body to discharge a load, said means being placed in an operative relation to the overhanging portion of said dump body when said tractor is backed under said trailer, said means having a loose connection with the overhanging portion of said dump body to permit withdrawal of said tractor from said trailer at will.

7. A tractor dump body trailer as called for in claim 6, wherein said means has a swivelled hook in the axis of said coupling.

8. A tractor, a trailer adapted to be coupled to said tractor, a body supporting frame pivoted on the rear end of said trailer, a vertically swingable member on the forward end of said frame to facilitate lifting said frame, and means on said tractor adapted to automatically engage said swingable member and cause it to swing in an arc to lift said body supporting frame.

9. The combination of a vehicle having a tiltable dump body frame, a tractor for moving said vehicle, a hoist on said tractor, a yoke on said dump body frame, and a hook operatable by said tractor hoist for engagement with said yoke to tilt said dump body frame.

10. The combination called for in claim 9 wherein said yoke is swingable relative to said dump body frame, and said hook swiveled relative to said hoist.

11. The combination called for in claim 9, wherein said hoist includes a beam and an adjustable beam extension for supporting said hook.

12. The combination of a trailer, a tractor coupled to said trailer and adapted for movement at an angle to said trailer, a tiltable dump body frame carried by said trailer, a yoke adapted for raising and tilting said dump body frame, said yoke extending rearwardly over the forward end of said body frame, a hoist on said tractor, and means carried by said hoist engageable with said yoke for raising it, said means permitting said tractor to move at an angle to said trailer without disengaging said hoist.

In testimony whereof I affix my signature.

SIDNEY B. WINN.